Oct. 15, 1957  J. FEATONBY  2,809,803
TURBINE WITH ADJUSTABLE STATOR BLADES
Original Filed April 30, 1951
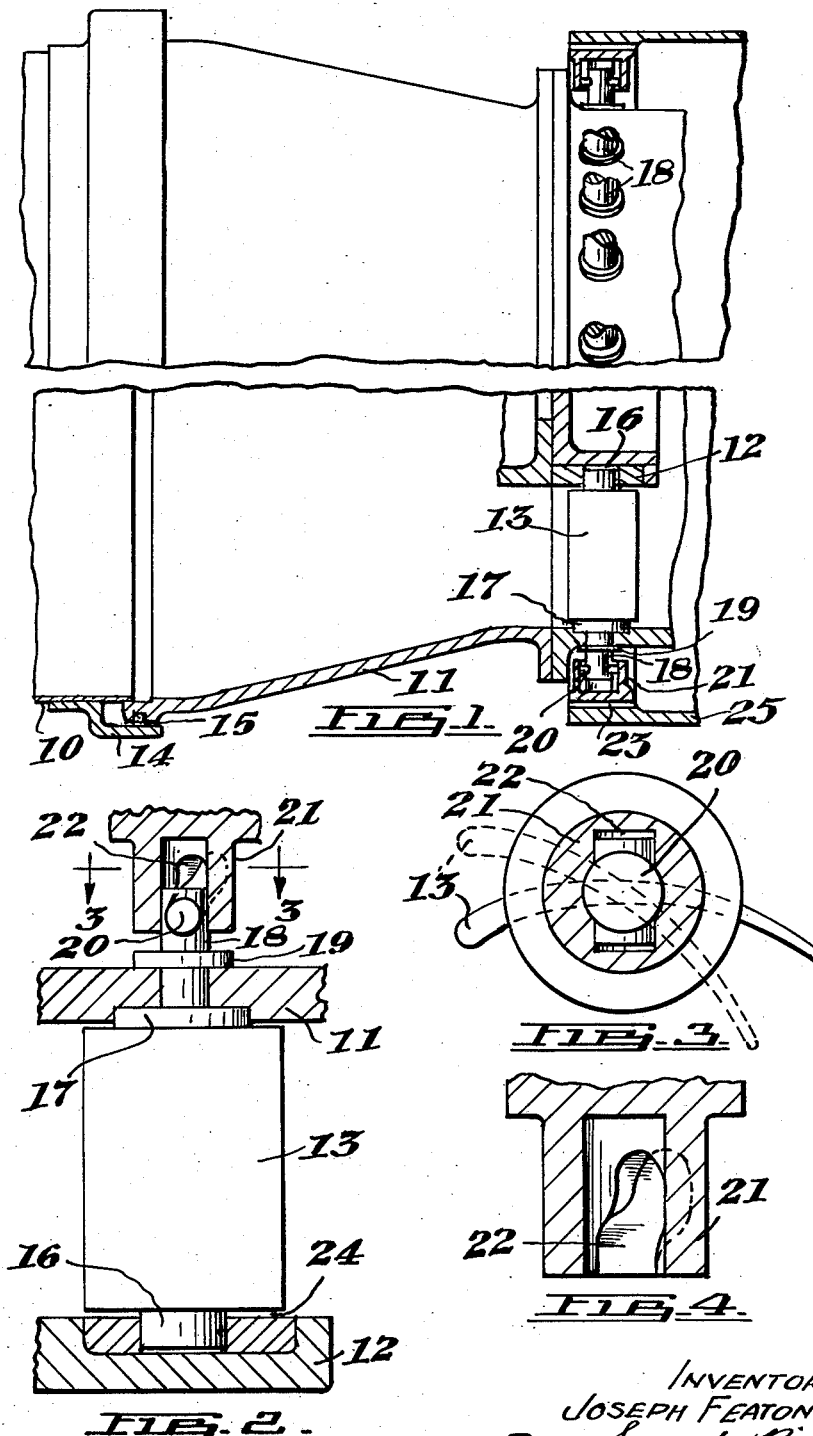
INVENTOR
JOSEPH FEATONBY
By — Smart & Biggar
ATTORNEYS.

United States Patent Office 2,809,803
Patented Oct. 15, 1957

2,809,803

TURBINE WITH ADJUSTABLE STATOR BLADES

Joseph Featonby, Ottawa, Ontario, Canada, assignor to National Research Council, Ottawa, Ontario, Canada, a body corporate Original application April 30, 1951, Serial No. 223,673, now Patent No. 2,697,326, dated December 21, 1954. Divided and this application November 15, 1954, Serial No. 468,955

2 Claims. (Cl. 253—78)

This application is a division of United States application Serial No. 223,673, filed April 30, 1951, now Patent No. 2,697,326.

This invention relates generally to turbines, and more particularly to means for varying the angles of attack of at least some of the stator blades of a turbine.

It has been appreciated by turbine designers for many years that a substantial improvement in performance and efficiency is obtainable by varying the angles of attack of the stator blades (i. e. varying the nozzle openings) in accordance with the loading of the turbine.

The provision of variable nozzle openings permits of rotor and stator blading design which yields a higher efficiency with a lower Mach number at the entry to the rotor blading. Where the angles of attack of the stator blades are variable, the probability of reaching the "choking point" in, say, a high compression ratio turbine would be greatly reduced and "blow off" in starting may be obviated.

Despite these attractive possibilities, it is still normal practice to design turbines with the angle of attack of the stator blades fixed, since no simple practical means has been provided for varying the nozzle openings according to load. I am well aware that there have been many proposals for accomplishing this desirable variation of the blades, but none of the prior proposals known to me have been sufficiently simple and effective to lead to any wide acceptance.

The basic principle underlying my invention is the adjustment of the angles of attack of stator blades of a turbine by means of a simple mechanical arrangement which is directly actuated in a positive manner by the radial "thermal growth" of the turbine, a factor which has previously been regarded only as a handicap in turbine design.

It is interesting to note that, while as pointed out above, it has been known for years that it would be advantageous to be able to vary the nozzle openings, it is today common practice to use non-adjustable stator blades and to give the leading edges of the rotor blades a greater thickness than the optimum for efficiency in order that the reactor may give a reasonable performance off the design point. With this compromise, when the turbine is running off the design point, the rotor blades offer a better angle of reception to the gases flowing from the turbine nozzles, but the efficiency of the turbine at its design point is reduced due to the increased thickness of the leading edges of the rotor blades and the consequent reduction of the area for passage of the gases. The relative Mach number is increased and may become critical. That this unsatisfactory compromise is tolerated, is, I feel, evidence that the prior proposals for varying the angles of attack of stator blades are either inoperative or complicated to the point of impracticability.

My simple proposal for utilizing the radial thermal growth of the turbine components to vary the nozzle openings with temperature permits rotor blade design which offers an efficient reception angle to the gases flowing to the rotor blades from the adjustable stator blades. Improved performance, both at and off the design point, results from my proposal.

My invention may generally be defined as the provision, in a turbine having an outer stator casing, an inner stator casing, and a plurality of adjustable stator blades mounted between inner and outer stator casings, of means for varying the angles of attack of the adjustable stator blades, said means comprising means for mounting each of the adjustable blades to rotate about an axis which is fixed with respect to the stator casing, a member surrounding the outer stator casing and spaced therefrom so as to be relatively unaffected by heat developed during operation of said rotor, and a linkage connecting said member and each blade, each linkage consisting of an element extending radially between a blade and said member, projections extending transversely from said radially extending element, a sleeve extending radially over a portion of the distance said member is spaced from the outer stator casing, and arcuate guide slots extending in a generally radial direction in the inner side walls of said sleeve, said projections riding in said arcuate guide slots, said guide slots being arranged to impart rotary motion to said blades whenever radial thermal growth of said turbine causes relative radial movement of said member and said stator casing and thus forces sliding of said projections in said arcuate slots.

In drawings which illustrate a presently preferred embodiment of the invention applied to turbines:

Figure 1 is a side elevation, partly broken away, of said embodiment;

Figure 2 is a fragmentary section on an enlarged scale showing the means for adjustably mounting one of the blades;

Figure 3 is a section on the line 3—3 of Figure 2, with the outer stator casing removed to render the blade visible, and Figure 4 is a detail of one of the blade-adjusting slots.

Referring first to Figures 1 and 2, reference numeral 10 indicates the wall of the combustion chamber of a gas turbine, 11 indicates the outer stator casing, and 12 the inner stator casing. A plurality of stator blades, one of which is indicated at 13, extend between the two stator casings and are each mounted to rotate about an axis which is fixed with respect to the stator casing. A circular flange 14 extends around the combustion chamber at the end adjacent the stator, the flange being rigidly secured to the combustion chamber wall 10. An expansion joint 15 is provided between flange 14 and the forward end of outer stator casing 11. A tubular member 25 is generally concentrically disposed with respect to the stator casing, being spaced some distance outwardly therefrom and enveloping the outer casing 11 in the region of the adjustable blades 13. Tubular member 25 is rigidly secured to a portion of the apparatus which is relatively unaffected by the heat developed during operation of the turbine. For example it might be attached to the engine nacelle of an aeroengine or to the bedplate of a stationary turbine.

Each blade 13 is mounted for roation within the stator casing by a cylindrical boss 16 disposed within a cylindrical recess in casing 12 and a cylindrical boss 17 which is received in a cylindrical recess in outer casing 11. Bosses 16 and 17 are preferably integral with the blade 13, but are in any event fixed with respect thereto. A rod-like member 18 projects axially from, and is rigidly secured to (or is integral with), boss 17, and extends through casing 11, projecting therewithout. A collar is fixed to rod-like member 18 where the latter emerges from stator casing 11; and two diametrically opposed transverse projections 20 extend from rod-like member 18 adjacent the free end thereof.

A plurality of sleeves 21 are mounted on the tubular member 25, and like member 25 are relatively unaffected by the heat developed during operation of the turbine. Two similar but diametrically opposed guide slots 22 are provided in the inner side wall of each sleeve 21. Slots 22, while extending generally radially, are arcuate over a portion of their lengths so that they are partially axially directed. The slots are slightly wider than the diameter of the projections 20. The free end of each rod-like member 18 is disposed within one of the sleeves 21, with the projections 20 riding in the guide slots 22. Sleeves 21 are splined or keyed to the tubular member 25 as indicated at 23, whereby relative movement, axially of the turbine, is permitted between the sleeves 21 and the member 25, although no relative radial movement is permitted.

The angles of attack of adjustable blades 13 will be varied in accordance with the temperature of the motive gases in the following manner. The hot gases passing through the turbine cause turbine casings 11 and 12 to expand. Member 25 and sleeves 21 will be relatively unaffected by the heat developed and will remain at a relatively fixed radial distance from the longitudinal axis of the stator casing. Radial outward expansion of outer stator casing 11 moves collar 19 outwardly, and rod-like members 18 are carried further into the sleeves 21. As the members 18 penetrate sleeves 21 more deeply the projections 20 are forced to slide in the arcuate slots 22, and the curvature of the slots forces the rod-like members 18 to rotate. Rotation of the members 18 in turn rotates the blades 13.

Since the outer stator casing 11 will expand and contract in advance of the inner casing 12, I recommend that a clearance as indicated at 24, be left between each blade 13 and the inner stator casing 12 to avoid damage of the blade. I should also like to point to the advisability of leaving adequate clearance between the rod-like members 18 and the sleeves 21 on the one hand, and between projections 20 and slots 22 on the other hand, since otherwise binding may occur due to the fact that member 18 and the projections 20 are more affected by heat than the sleeves 21 and their slots 22.

What I claim as my invention is:

1. A turbine having an outer stator casing, an inner stator casing, and a plurality of adjustable stator blades mounted in and extending between said inner and outer stator casings, said blades being mounted in said stator casings for rotation about axes which are fixed with respect to the casings, and means for varying the angles of attack of the adjustable stator blades, said means comprising a tubular member surrounding the outer stator casing and spaced therefrom so as to be relatively unaffected by heat developed during operation of said turbine, and a linkage connecting said tubular member and each blade, each linkage consisting of a rod-like member fixed to one of said blades and extending radially between said blade and said tubular member, projections fixed to said radially extending element and extending transversely therefrom, a sleeve extending radially over a portion of the distance said member is spaced from the outer stator casing, said sleeve being radially fixed with respect to said tubular member and having an inner side wall, and guide slots extending in a generally radial direction in said inner side wall, said slots being arcuate over a portion of their lengths so that they are partially axially directed, said projections riding in said guide slots, wherein rotary motion is imparted to said blades whenever radial thermal growth causes relative radial movement of said tubular member and said stator casings and thus forces sliding of said projections in said guide slots.

2. A turbine as defined in claim 1, wherein said adjustable blades are mounted in said stator casings by means of bosses fixed to the opposite ends of said blades and cylindrical recesses in said inner and outer stator casings for the reception of said bosses.

No references cited.